(12) United States Patent
Praw (10) Patent No.: US 10,556,841 B2
(45) Date of Patent: Feb. 11, 2020

(54) METHOD OF FORMING AN ENCAPSULATED FERTILIZER

(71) Applicant: BASF SE, Ludwigshafen (DE)

(72) Inventor: Michael Praw, Rockwood, MI (US)

(73) Assignee: BASF SE, Ludwigshafen am Rhein (DE)

( * ) Notice: Subject to any disclaimer, the term of this patent is extended or adjusted under 35 U.S.C. 154(b) by 97 days.

(21) Appl. No.: 15/306,908

(22) PCT Filed: Apr. 27, 2015

(86) PCT No.: PCT/US2015/027725
§ 371 (c)(1),
(2) Date: Oct. 26, 2016

(87) PCT Pub. No.: WO2015/167988
PCT Pub. Date: Nov. 5, 2015

(65) Prior Publication Data
US 2017/0036968 A1   Feb. 9, 2017

Related U.S. Application Data

(60) Provisional application No. 61/985,177, filed on Apr. 28, 2014.

(51) Int. Cl.
*C05G 3/00* (2006.01)
*C05C 9/00* (2006.01)

(52) U.S. Cl.
CPC ............ *C05G 3/0029* (2013.01); *C05C 9/005* (2013.01); *C05G 3/0082* (2013.01); *C05G 3/0094* (2013.01)

(58) Field of Classification Search
CPC .. C05G 3/0029; C05G 3/0094; C05G 3/0082; C05C 1/02; C05C 11/00; C05C 9/005
See application file for complete search history.

(56) References Cited

U.S. PATENT DOCUMENTS 3,232,739 A   2/1966   Belak
3,245,776 A   4/1966   Rubin
(Continued)

FOREIGN PATENT DOCUMENTS

CN   1793084 A     6/2006
CN   103626592 A   3/2014
(Continued)

OTHER PUBLICATIONS

International Search Report for Application No. PCT/US2015/027725 dated Jul. 7, 2015, 4 pages.
(Continued)

*Primary Examiner* — Jennifer A Smith
(74) *Attorney, Agent, or Firm* — DLA Piper LLP (US)

(57) ABSTRACT

Method of forming an encapsulated fertilizer that includes the step of providing a core particle. The core particle includes a fertilizer and has an outer surface. The method further includes the step of applying an isocyanate component directly to the outer surface of the core particle. The isocyanate component has isocyanate functional groups. The method further includes the step of reacting the isocyanate component with ambient moisture to form a layer disposed about the core particle to form the encapsulated fertilizer. The layer includes polyurea linkages and may further include polyurethane linkages.

16 Claims, 3 Drawing Sheets

(56) References Cited

U.S. PATENT DOCUMENTS

| | | |
|---|---|---|
| 3,269,900 A | 8/1966 | Rubin |
| 3,373,009 A | 3/1968 | Pruitt et al. |
| 3,472,644 A | 10/1969 | Woodside et al. |
| 3,475,154 A | 10/1969 | Kato |
| 3,531,425 A | 9/1970 | Burk, Jr. et al. |
| 3,798,836 A | 3/1974 | Rubens et al. |
| 3,920,436 A | 11/1975 | Janssen |
| 4,034,508 A | 7/1977 | Dedolph |
| 4,035,951 A | 7/1977 | Dedolph |
| 4,074,997 A | 2/1978 | Cohen |
| 4,089,800 A | 5/1978 | Temple |
| 4,129,435 A | 12/1978 | Takematsu et al. |
| 4,157,983 A | 6/1979 | Golden |
| 4,294,986 A | 10/1981 | Spatz et al. |
| 4,402,725 A | 9/1983 | Heller et al. |
| 4,443,969 A | 4/1984 | Hanacek et al. |
| 4,469,502 A | 9/1984 | Heller et al. |
| 4,575,391 A | 3/1986 | DeBoodt et al. |
| 4,804,403 A | 2/1989 | Moore |
| 4,806,142 A | 2/1989 | Shapiro |
| 4,833,218 A | 5/1989 | Lee |
| 4,882,166 A | 11/1989 | Graham et al. |
| 4,908,056 A | 3/1990 | Tseng |
| 4,931,362 A | 6/1990 | Zsifkovits et al. |
| 5,041,290 A | 8/1991 | Gindrat et al. |
| 5,225,278 A | 7/1993 | Kielbania, Jr. et al. |
| 5,310,721 A | 5/1994 | Lo |
| 5,851,261 A | 12/1998 | Markusch et al. |
| 6,001,147 A | 12/1999 | Markusch et al. |
| 6,152,981 A | 11/2000 | Markusch et al. |
| 6,165,550 A | 12/2000 | Markusch et al. |
| 6,322,606 B1 | 11/2001 | Komoriya et al. |
| 6,358,296 B1 | 3/2002 | Markusch et al. |
| 6,364,925 B1 | 4/2002 | Markusch et al. |
| 6,615,539 B1 | 9/2003 | Obonai et al. |
| 6,617,412 B2 | 9/2003 | Markusch et al. |
| 6,777,524 B1 | 8/2004 | Shimizu et al. |
| 7,416,785 B2 | 8/2008 | Mente |
| 7,452,399 B2 | 11/2008 | Whittington |
| 7,713,326 B2 | 5/2010 | Carstens et al. |
| 8,080,317 B2 | 12/2011 | Watanabe |
| 8,303,680 B2 | 11/2012 | Mente |
| 2005/0066697 A1 | 3/2005 | Cline et al. |
| 2007/0137274 A1 | 6/2007 | Wynnyk et al. |
| 2007/0169527 A1 | 7/2007 | Wynnyk et al. |
| 2008/0076832 A1 | 3/2008 | Winters et al. |
| 2008/0236228 A1 | 10/2008 | Geiger et al. |
| 2010/0186470 A1 | 7/2010 | Xing et al. |
| 2010/0196431 A1 | 8/2010 | Watanabe et al. |
| 2010/0307211 A1 | 12/2010 | Xing et al. |
| 2010/0326152 A1* | 12/2010 | Mente .................. C05G 3/0029 71/27 |
| 2012/0111075 A1 | 5/2012 | Hargrove et al. |
| 2012/0111076 A1 | 5/2012 | Avdala et al. |
| 2012/0111077 A1 | 5/2012 | Maruvada et al. |
| 2012/0198898 A1 | 8/2012 | Fujii et al. |
| 2012/0272700 A1 | 11/2012 | Nevin |
| 2013/0039965 A1 | 2/2013 | Fujii et al. |
| 2013/0042659 A1 | 2/2013 | Beatty et al. |
| 2013/0305796 A1 | 11/2013 | Hudson et al. |
| 2013/0309499 A1 | 11/2013 | Neff et al. |
| 2015/0291481 A1* | 10/2015 | Neff ....................... A01N 25/26 504/347 |

FOREIGN PATENT DOCUMENTS

| | | |
|---|---|---|
| EP | 0 974 568 A2 | 1/2000 |
| EP | 0 974 569 A2 | 1/2000 |
| EP | 0 974 609 A1 | 1/2000 |
| WO | WO 91/10362 A1 | 7/1991 |
| WO | WO 98/29359 A1 | 7/1998 |
| WO | WO 2012/151506 A1 | 11/2012 |

OTHER PUBLICATIONS

BASF, "Safety Data Sheet—Lupranate MP102 Isocyanate", Mar. 20, 2011, pp. 1-10.

* cited by examiner

METHOD OF FORMING AN ENCAPSULATED FERTILIZER

CROSS-REFERENCE TO RELATED APPLICATIONS

This application is the National Stage of International Patent Application No. PCT/US2015/027725, filed on Apr. 27, 2015, which claims priority to and all the advantages of U.S. Provisional Patent Application No. 61/985,177, filed on Apr. 28, 2014, the content of which is incorporated herein by reference.

FIELD OF THE INVENTION

The present invention generally relates to a method of forming an encapsulated fertilizer and to an encapsulated fertilizer formed according to the method, specifically to a method of forming an encapsulated fertilizer comprising a core particle and a layer disposed about the core particle with the layer comprising the reaction product of an isocyanate component and ambient moisture.

DESCRIPTION OF THE RELATED ART

Encapsulated fertilizers, such as controlled-release fertilizers, are known in the agricultural art. Such encapsulated fertilizers typically include one or more polyurethane layers disposed about a core particle, typically a fertilizer (e.g. urea). Thickness and integrity of the polyurethane layer limits dissolution rate of the encapsulated fertilizers, specifically, a rate that the core particle degrades releasing itself, e.g. a "payload", into soil that includes moisture.

Unfortunately, many conventional encapsulated fertilizers include inconsistent thickness of the polyurethane layer, which results in accelerated dissolution rates. Such accelerated dissolution rates lead to waste and phytotoxicity, i.e., toxic effect of the fertilizer on plant growth. Further, many conventional encapsulated fertilizers have polyurethane layers with integrity problems, since the polyurethane layers include defects, such as cracks, pits, depressions, etc. When a polyurethane layer including such defects is disposed about the core particle, the cracks, pits, and/or depressions allow water and other liquids to permeate the polyurethane layer, thus prematurely contacting and dissolving the core particle. To cure such defects, multiple polyurethane layers must typically be disposed about the core particle resulting in a time consuming and expensive manufacturing process for forming the encapsulated fertilizers. Yet further, many conventional encapsulated fertilizers are prone to breakage, due to the polyurethane layer lacking adequate hardness and resiliency. Such breakage reduces shelf life of the encapsulated fertilizers, and results in waste during storage, handling, and use of the encapsulated fertilizers.

Conventional polyurethane layers are typically based on a two component ("2K") urethane system where one part is an isocyanate and the other part is a polyol. An excess of the isocyanate relative to the polyol is often used because of an isocyanate/water side-reaction from water that is present during the coating process. Many processes also require the isocyanate and the polyol to be applied at different times or at the exact same time, which adds to inconsistencies during manufacture. There is also the issue of inconsistent moisture during application of the reactive components. If too much water is present during application of the reactive components, there may not be enough isocyanate left to react with all the polyol. This is because a polyurea reaction (between water and isocyanate groups) can be faster than a polyurethane reaction (between polyol and isocyanate groups). This can lead to inconsistent properties of the resulting layer, with unreacted polyol lowering performance of the encapsulated fertilizer.

Accordingly, there remains an opportunity to provide improved methods of forming encapsulated fertilizers. There also remains an opportunity to provide improved encapsulated fertilizers.

SUMMARY OF THE INVENTION AND ADVANTAGES

Disclosed is a method of forming an encapsulated fertilizer. The method comprises the step of providing a core particle. The core particle comprises a fertilizer and has an outer surface. The method further comprises the step of applying an isocyanate component directly to the outer surface of the core particle. The isocyanate component has isocyanate functional groups. The method further comprises the step of reacting the isocyanate component with ambient moisture to form a layer disposed about the core particle to form the encapsulated fertilizer. The layer comprises polyurea linkages. Optionally, the layer may further comprise polyurethane linkages.

Generally, using only one component (i.e., the isocyanate component) simplifies application and increases manufacturing output of the encapsulated fertilizer relative to systems utilizing two or more reactive components, e.g. an isocyanate and a polyol. A more consistent and better coating layer can be achieved since generally the only reaction occurring after the isocyanate component is applied is a polyurea reaction. Having a consistent coating layer also provides a more standardized time release of the fertilizer.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Disclosed is a method of forming an encapsulated fertilizer. Also disclosed is an encapsulated fertilizer formed according to the method. Referring to the Figures, wherein like numerals indicate like parts throughout the several views, an encapsulated fertilizer formed according to the method is shown generally at 10. The encapsulated fertilizer 10 is not drawn to scale.

The method comprises the step of providing a core particle 12. The core particle 12 has an outer surface 14. The method further comprises the step of applying an isocyanate component directly to the outer surface 14 of the core particle 12. The method further comprises the step of reacting the isocyanate component with ambient moisture to form a layer 16 disposed about the core particle 12 to form the encapsulated fertilizer 10. The layer 16 comprises polyurea linkages. In certain embodiments, the layer 16 further comprises polyurethane linkages.

The encapsulated fertilizer 10 comprises the core particle 12. The core particle 12 comprises a fertilizer. In various embodiments, the outer surface 14 of the core particle 12 comprises the fertilizer. In specific embodiments, the entire core particle 12 comprises the fertilizer. In certain embodiments, the core particle 12 consists essentially of the fertilizer. In further embodiments, the core particle 12 consists of (i.e., is) the fertilizer.

In various embodiments, the fertilizer is selected from the group of nitrogen, phosphate, potash, sulfur, and combinations thereof. In certain embodiments, the fertilizer is nitrogen based. Examples of suitable nitrogen based fertilizers include anhydrous ammonia, urea, ammonium nitrate, urea ammonium nitrate, calcium ammonium nitrate, and combinations thereof. In specific embodiments, the fertilizer comprises, consists essentially of, or consists of, urea. In other embodiments, the fertilizer is phosphate based. Examples of suitable phosphate based fertilizers include phosphoric acid, mono-ammonium phosphate, ammonium polyphosphate, ammonium phosphate sulfate, and combinations thereof. In yet other embodiments, the fertilizer is potash based. Examples of suitable potash based fertilizers include potash, ammonium nitrate, and combinations thereof. In yet other embodiments, the fertilizer is sulfur based. Examples of suitable sulfur based fertilizers include ammonium sulfate, sulfuric acid, and combinations thereof. Various combinations of fertilizers can be utilized as, or in, the core particle 12. Suitable fertilizers are commercially available from a variety of suppliers, and this disclosure is not limited to any particular one.

Typically, the encapsulated fertilizer 10 includes one of the core particles 12, e.g. as shown in the Figures. However, the encapsulated fertilizer 10 can also include any combination of two or more of the aforementioned core particles 12. In such embodiments, the core particle 12 can comprise, but is not limited to, a blend of core particle compositions, individual sub-particles of the core particle 12, and/or layers of different core particle compositions. For example, the core particle 12 can comprise an inner-core comprising sulfur with an outer-core disposed about the inner-core and comprising urea (not shown).

The core particle 12 can be of various sizes and shapes. Typically, the core particle 12 is substantially spherical, having an average diameter of from about 0.1 to about 5, about 0.1 to about 2.5, about 0.25 to about 1, millimeters (mm), or any average diameter between about 0.1 to about 5 mm. Other sizes and/or shapes of core particles 12 can also be used, such as irregular, oblong, and/or platelet shaped particles.

In various embodiments, the core particle 12 has a moisture content prior to the step of applying. The core particle 12 can have various moisture contents. Typically, the core particle 12 has a moisture content of at least about 1 weight percent (wt. %), alternatively a moisture content of from about 1 to about 20, about 1 to about 10, about 5 to about 10, wt. %., or any moisture content between about 1 and about 20 wt. %.

The moisture content may be imparted by purposeful addition (e.g. by soaking, spraying, coating, dipping, etc.), but is more typically innate. For example, certain fertilizers (e.g. urea), are hygroscopic. Hygroscopic fertilizers readily absorb moisture from the atmosphere. This can occur during routine manufacture, handling, and/or storage of the fertilizer. In other words, no purposeful addition of moisture/water is required. The moisture content of the core particle 12 is useful for establishing the ambient moisture as described further below. In addition, the moisture content of the core particle 12 can also provide surface moisture on or at the outer surface 14 of the core particle 12. In these instances, the remainder of the moisture content is generally present throughout the core particle 12 and/or is generally present as a moisture content gradient.

In embodiments where the outer surface 14 of the core particle 12 comprises surface moisture, the step of reacting is further defined as reacting the isocyanate component with ambient moisture and the surface moisture to form the encapsulated fertilizer 10. In this way, reaction occurs on both sides of the isocyanate component after application to the outer surface 14 of the core particle 12. Specifically, isocyanate functional groups provided by the isocyanate component are free to react with surface moisture on the outer surface 14 of the core particle 12, as well as with ambient moisture at the surface 20 of the layer 16 (during formation).

In other embodiments, the outer surface 14 of the core particle 12 comprises amine functional groups (i.e., "surface amines"). The surface amines can be provided by the core particle 12, such as when the core particle 12 comprises urea as the fertilizer. In these embodiments, the step of reacting is further defined as reacting the isocyanate component with ambient moisture and the amine functional groups to form the encapsulated fertilizer 10. In this way, reaction occurs on both sides of the isocyanate component after application to the outer surface 14 of the core particle 12. Specifically, isocyanate functional groups provided by the isocyanate component are free to react with amine groups on the outer surface 14 of the core particle 12, as well as with ambient moisture at the surface 20 of the layer 16 (during formation).

In related embodiments, the outer surface 14 of the core particle 12 comprises both surface moisture and surface amines. In these embodiments, the step of reacting is further defined as reacting the isocyanate component with ambient moisture, the surface moisture, and the amine functional groups to form the encapsulated fertilizer 10. This reaction scheme is a combination of the aforementioned embodiments. Specifically, isocyanate functional groups provided by the isocyanate component are free to react with the surface moisture and surface amines on the outer surface 14 of the core particle 12, as well as with ambient moisture at the surface 20 of the layer 16 (during formation).

The core particle 12 can be present in the encapsulated fertilizer 10 in various amounts. Typically, the core particle 12 is present in the encapsulated fertilizer 10 in an amount of from about 75 to about 99, about 90 to about 99, about 96 to about 98, parts by weight (pbw), or any amount between about 75 and about 99 pbw, each based on 100 pbw of the encapsulated fertilizer 10.

As shown in the Figures, the layer 16 is disposed about the core particle 12. It is to be understood that as used herein, the terminology "disposed about" encompasses both partial and complete covering of the core particle 12. Typically, the core particle 12 is completely covered by the layer 16, thereby protecting the core particle 12 from exposure to environmental conditions (such as from premature exposure to moisture).

Figure 1:
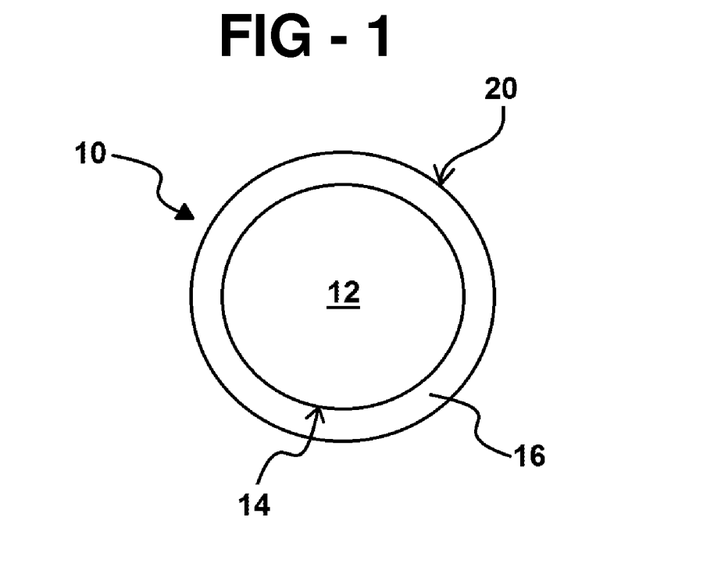
FIG. 1 is a cross-section of an encapsulated fertilizer having a core particle and a layer.

The layer 16 can be of various average thicknesses. The layer 16 typically has an average thickness that mimics thicknesses of conventional encapsulation layers, e.g. conventional fertilizer encapsulation layers. In various embodiments, the layer 16 has an average thickness of at least about 5, at least about 10, at least about 15, alternatively of from about 15 to about 300, about 50 to about 200, about 100 to 150, about 125 to about 150, microns, or any average thickness between about 5 and about 300 microns. The layer 16 can be formed into various thicknesses depending on one or more desired properties, such as dissolution rate of the encapsulated fertilizer 10. Therefore, the average thicknesses can be less or greater than those specifically described herein. In certain embodiments, as in FIGS. 1 and 3, the layer 16 is in direct contact with the core particle 12. In other words, there is no intervening layer (or portion thereof) between the layer 16 and the outer surface 14 of the core particle 12.

With respect to various embodiments of the layer 16, it is to be understood that the terminology "polyurea" encompasses chemistries that include both polyurea and/or urea linkages. In various embodiments, the layer 16 is defined as a polyurea layer 16. In further embodiments, the layer 16 includes polyurea linkages as well as additional linkages, e.g. polyurethane and/or urethane linkages. For example, in certain embodiments described below, the layer 16 is further defined as a polyurea/polyurethane layer 16. As used herein, description of the layer 16 is generally interchangeable with description of the polyurea layer 16 or the polyurea/polyurethane layer 16.

Typically, the layer 16 comprises the reaction product of the isocyanate component and water. Specifically, the layer 16 comprises the reaction product of the isocyanate component and water that is initially in the form of ambient moisture. In further embodiments, the layer 16 consists essentially of the reaction product of the isocyanate component and water. In yet further embodiments, the layer 16 consists of (i.e., is) the reaction product of the isocyanate component and water. In these embodiments, a portion of the water can also be imparted by surface moisture rather than entirely by ambient moisture. In addition or alternate to reaction with the surface moisture, the surface amines may also contribute to the reaction product.

The layer 16 can be present in the encapsulated fertilizer 10 in various amounts. Typically, the layer 16 is present in the encapsulated fertilizer 10 in an amount of from about 25 to about 1, about 10 to about 1, about 4 to about 2, pbw, or any amount between about 25 and about 1 pbw, each based on 100 pbw of the encapsulated fertilizer 10. Generally, this disclosure provides for less material use, e.g. less isocyanate component use, relative to prior art encapsulated fertilizers.

The isocyanate component has isocyanate functional groups. The isocyanate component typically comprises a polyisocyanate having two or more isocyanate functional (NCO) groups. Suitable polyisocyanates include, but are not limited to, conventional aliphatic, cycloaliphatic, araliphatic and aromatic isocyanates. In certain embodiments, the isocyanate component is selected from the group of diphenylmethane diisocyanates (MDIs), polymeric diphenylmethane diisocyanates (PMDIs), and combinations thereof. Polymeric diphenylmethane diisocyanates are also referred to in the art as polymethylene polyphenylene polyisocyanates. In specific embodiments, the isocyanate component comprises a MDI. Examples of other suitable isocyanates include toluene diisocyanates (TDIs), hexamethylene diisocyanates (HDIs), isophorone diisocyanates (IPDIs), naphthalene diisocyanates (NDIs), and combinations thereof.

In various embodiments, the isocyanate component comprises, consists essentially of, or consists of (i.e., is) an isocyanate-terminated prepolymer. The isocyanate-terminated prepolymer is typically the reaction product of an isocyanate and a polyol and/or a polyamine. The isocyanate may be any type of isocyanate, such as one or more of the aforementioned polyisocyanates. Various types of polyols and polyamines can be utilized.

Utilizing one or more polyols is useful for imparting polyurethane linkages in the isocyanate-terminated prepolymer and therefore, in the layer 16. Similarly, utilizing one or more polyamines is useful for imparting polyurea linkages in the isocyanate-reactive component, and therefore, in the layer 16. Reaction between isocyanate and hydroxyl groups to form polyurethane linkages is understood in the art. Moreover, reaction between isocyanate and amine groups to form polyurea linkages is understood in the art. One of skill in the art can readily envisage embodiments of the layer 16 having only polyurea linkages or both polyurea and polyurethane linkages depending on the particular isocyanate component utilized.

In certain embodiments, the isocyanate-terminated prepolymer comprises the reaction product of a MDI and a polyol having at least two hydroxyl functional groups. In these embodiments, the isocyanate-terminated prepolymer comprises polyurethane linkages such that the layer 16 is a polyurea/polyurethane layer 16. Further, the isocyanate component may also include free isocyanate in addition to the isocyanate-terminated prepolymer. In these instances, the isocyanate-terminated prepolymer can be present in the isocyanate component in various amounts. Typically, the isocyanate-terminated prepolymer is present in an amount of from about 10 to about 90, about 25 to about 75, about 40 to about 60, about 45 to about 55, pbw, or any amount between about 25 and about 75 pbw, each based on 100 pbw of the isocyanate component.

It is thought that utilizing the isocyanate-terminated prepolymer provides one or more non-limiting benefits as follows. Using the isocyanate-terminated prepolymer can ensure a more consistent reaction between the polyol (and/or polyamine) and the isocyanate leading to a consistent layer 16 with desirable hydrophobic properties. Specifically, there are no competing reactions during the application/coating process (polyurea versus polyurethane reaction), which leads to a layer 16 with improved and more consistent properties (e.g. hardness, tack, surface tension, hydrophobicity, toughness, etc.). Typically, there aren't issues of mix ratio for the two components (e.g. isocyanate and polyol) since only one component (i.e., the prepolymer) is being applied during formation of the encapsulated fertilizer 10. Therefore, there is no need for complex or multiple pieces of application equipment. Applying one component instead of two components also leads to faster application times, improved layers 16, and/or increased output of the encapsulated fertilizer 10.

If utilized to make the isocyanate-terminated prepolymer, the polyol is typically selected from the group of ethylene glycol, diethylene glycol, propylene glycol, dipropylene glycol, butane diol, glycerol, trimethylolpropane, triethanolamine, pentaerythritol, sorbitol, and combinations thereof. In certain embodiments, the polyol utilized to form the isocyanate-terminated prepolymer is a graft polyol. In one embodiment, the graft polyol is a polymer polyol. In other embodiments, the graft polyol is selected from the group of polyharnstoff (PHD) polyols, polyisocyanate polyaddition (PIPA) polyols, and combinations thereof.

If utilized to make the isocyanate-terminated prepolymer, the polyamine is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof. The isocyanate-terminated prepolymer may be formed from a combination of two or more of the aforementioned polyols and/or polyamines.

The isocyanate component may also be a modified isocyanate, such as, carbodiimides, allophanates, isocyanurates, and biurets. Other suitable isocyanates and optional components include those described in U.S. Pat. No. 7,416,785 to Mente and U.S. Pat. No. 8,303,680 to Mente, in U.S. Pat. App. Pub. No. 2013/0305796 to Hudson et al. and 2013/0309499 to Neff et al., and in WO2012151506 to Neff et al., the disclosures of which are incorporated herein by reference in their entirety. Specific examples of suitable isocyanate components include those that are commercially available from BASF Corporation of Florham Park, N.J., under the trademark LUPRANATE®, such as LUPRANATE® M, LUPRANATE® MI, LUPRANATE® M20, LUPRANATE® M20SB, LUPRANATE® M20HB, LUPRANATE® M20FB, and LUPRANATE® MP102, isocyanates.

The isocyanate component can be of various viscosities. Typically, the isocyanate component has a viscosity which is suitable for specific applications of the isocyanate component to the core particle 12, such as by spraying, fogging, and/or atomizing the isocyanate component to apply the isocyanate component to the outer surface 14 of the core particle 12. In certain embodiments, the isocyanate component has a viscosity of from about 10 to about 5,000, about 25 to about 2,500, about 50 to about 1,500, about 100 to about 1,000, about 500 to about 1,000, cps at 25° C., or any viscosity between about 10 to about 5,000 cps at 25° C., according to ASTM D2196. Regardless of the application technique, the viscosity of the isocyanate component should be sufficient to adequately coat the core particle 12.

The isocyanate component can be of various nominal functionalities and NCO contents. In certain embodiments, the isocyanate component has a nominal functionality of from about 1 to about 5, about 1.5 to about 4, about 2 to about 3, or any nominal functionality between about 1 and about 5. In certain embodiments, the isocyanate component has an NCO content of from about 1 to about 50, about 1 to about 40, about 1 to about 30, about 10 to about 30, about 20 to about 25, wt. %, or any NCO content between about 20 and about 50 wt. %, each based on 100 pbw of the isocyanate component. The aforementioned NCO contents generally provide a high molecular crosslink density of the isocyanate component that aids in the formation of a defect free layer 16, and also provide the isocyanate component with more chemical bonds per unit of mass to improve cost efficiency. The isocyanate component may include any combination of the aforementioned isocyanates and/or isocyanate-terminated prepolymers.

The reaction product may further comprise an additive component. If utilized, the additive component is typically selected from the group of parting agents, catalysts, biocides, fillers, plasticizers, stabilizers, cross-linking agents, chain-extending agents, chain-terminating agents, air releasing agents, wetting agents, surface modifiers, moisture scavengers, desiccants, viscosity reducers, reinforcing agents, colorants, anti-oxidants, compatibility agents, ultraviolet light stabilizers, thixotropic agents, anti-aging agents, lubricants, coupling agents, solvents, rheology promoters, thickeners, anti-static agents, and combinations thereof. If utilized, the additive component may be present in customary amounts. The additive component may include any combination of the aforementioned additives. The additive component may be reactive and/or inert with respect to the isocyanate component depending on the additive(s) utilized.

In certain embodiments, the additive component comprises a catalyst component. In other words, the layer 16 is formed in the presence of a catalyst. In one embodiment, the catalyst component comprises a tin catalyst. Suitable tin catalysts include tin(II) salts of organic carboxylic acids, e.g. tin(II) acetate, tin(II) octoate, tin(II) ethylhexanoate and tin(II) laurate. In one embodiment, the organometallic catalyst comprises dibutyltin dilaurate, which is a dialkyltin(IV) salt of an organic carboxylic acid. Specific examples of suitable organometallic catalyst, e.g. dibutyltin dilaurates, are commercially available from Air Products and Chemicals, Inc. of Allentown, Pa., under the trademark DABCO®. The organometallic catalyst can also comprise other dialkyltin(IV) salts of organic carboxylic acids, such as dibutyltin diacetate, dibutyltin maleate and dioctyltin diacetate.

Examples of other suitable catalysts include iron(II) chloride; zinc chloride; lead octoate; tris(dialkylaminoalkyl)-s-hexahydrotriazines including tris(N,N-dimethylaminopropyl)-s-hexahydrotriazine; tetraalkylammonium hydroxides including tetramet hylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable catalysts, specifically trimerization catalysts, include N,N,N-dimethylaminopropylhexahydrotriazine, potassium, potassium acetate, N,N,N-trimethyl isopropyl amine/formate, and combinations thereof. A specific example of a suitable trimerization catalyst is commercially available from Air Products and Chemicals, Inc. under the trademark POLYCAT®.

Yet further examples of other suitable catalysts, specifically tertiary amine catalysts, include dimethylaminoethanol, dimethylaminoethoxyethanol, triethylamine, N,N,N',N'-tetramethylethylenediamine, N,N-dimethylaminopropyl amine, N,N,N',N',N"-pentamethyldipropylenetriamine, tris(dimethylaminopropyl)amine, N,N-dimethylpiperazine, tetramethylimino-bis(propylamine), dimethylbenzylamine, trimethylamine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N"-pentamethyldiethylenetriamine, 1,2-dimethylimidazole, 3-(dimethylamino)propylimidazole, and combinations thereof. Specific examples of suitable tertiary amine catalysts are commercially available from Air Products and Chemicals, Inc. under the trademark POLYCAT®.

If utilized, the catalyst component can be employed in customary amounts. The catalyst component may include any combination of the aforementioned catalysts. In certain embodiments, the encapsulated fertilizer 10 is formed in the absence of a catalyst.

In embodiments utilizing one or more catalysts, the catalyst may be purposefully added for reaction between the isocyanate component and ambient moisture. Alternatively, or in addition, one or more catalysts may already be present in the isocyanate component prior to reaction with ambient moisture. For example, in instances where the isocyanate-terminated prepolymer is utilized, one or more catalysts may have been used to initially form the prepolymer (e.g. a tertiary amine catalyst) and such catalysts can still be present during formation of the layer 16.

In certain embodiments, the additive component comprises a colorant, such as a dye and/or a pigment, for coloring the layer 16. The colorant allows completeness of the layer 16 to be visually evaluated and can provide various marketing advantages. If utilized, the colorant can be utilized in customary amounts.

Figure 2:
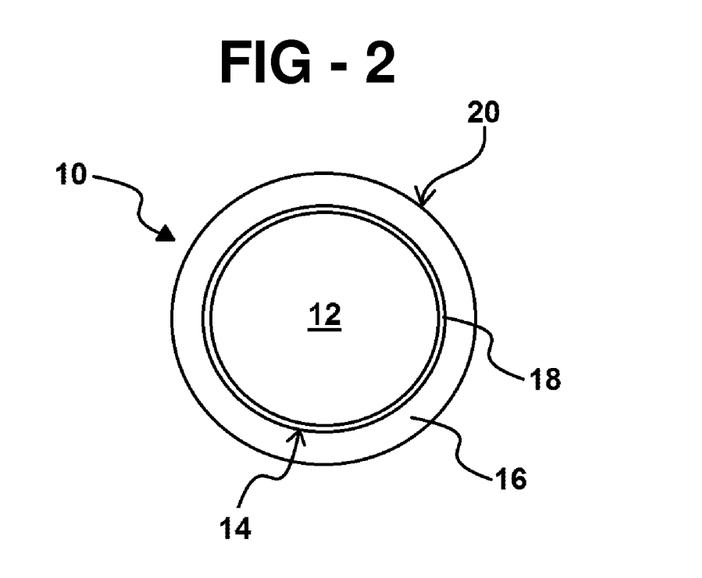
FIG. 2 is a cross-section of another encapsulated fertilizer further having an intermediate layer.
Figure 4:
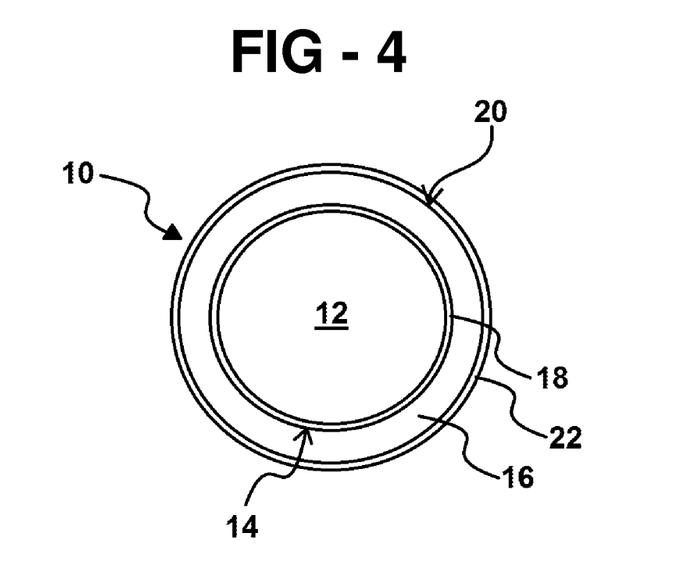
FIG. 4 is a cross-section of another encapsulated fertilizer having both intermediate and sealing layers.

In certain embodiments, the outer surface 14 of the core particle 12 is at least partially coated, alternatively is completely coated, with a compound other than fertilizer. For example, as shown in FIGS. 2 and 4, the encapsulated fertilizer 10 includes an intermediate layer 18 disposed between the core particle 12 and layer 16. Specifically, the intermediate layer 18 is disposed about the core particle 12 and the layer 16 is disposed about the intermediate layer 18.

The intermediate layer 18 may be a partial or a complete covering. The intermediate layer 18 is typically formed from the compound. Typically, the intermediate layer 18 is already present on the core particle 12 prior to formation of the layer 16. For example, the intermediate layer 18 can be a protective layer for the core particle 12.

In various embodiments, the compound can be referred to in the art as a dust suppressant. Dust suppressants are useful for handling the core particle 12, and may be present for other purposes in addition or alternate to dust suppression (e.g. to prevent agglomeration, skin contact, moisture absorption, etc.). Dust suppressants are typically liquids, such as oils, but can be solids, such as waxes. Particular examples of dust suppressants are petroleum residue, hydrogenated mineral oil, and wax. Suitable examples of waxes which may be used include, but are not limited to, organic waxes, thermoplastic polymers, mineral oils, or combinations thereof. More particularly, the wax may comprise paraffinic oil, paraffinic wax, vegetable wax, triglyceride, microcrystalline wax, petrolatum, olefin, polyethylene, petroleum wax, and combinations thereof. In one embodiment, the wax comprises a petroleum wax. In another embodiment, the wax comprises a petroleum wax and at least one other wax.

While optional, the dust suppressant can be utilized in various amounts. Typically, the intermediate layer 18 is present in an amount of from about 0.1 to about 10, about 0.1 to about 5, about 0.5 to about 3, pbw, or any amount between about 0.1 and about 10 pbw, each based on 100 pbw of the core particle 12. The intermediate layer 18 can be of various average thicknesses, such as those above for the layer 16.

Typically, the layer 16 is substantially free of water after formation. By "substantially free", it is meant that in these embodiments, water is present in an amount no greater than about 5, no greater than about 2.5, no greater than about 1, or approaching or equaling 0, pbw, each based on 100 pbw of the layer 16. If the layer 16 is completely free of water, the layer 16 is classified as anhydrous. It is generally preferred that the layer 16 has little to no water to prevent the encapsulated fertilizer from prematurely degrading, such as by softening, rupturing, or sticking/agglomerating to other adjacent encapsulated fertilizers 10 or surfaces. Such degradation can cause premature release of the core particle 12, and waste.

In certain embodiments, the layer 16 is substantially free of a wax, such as paraffin. By "substantially free", it is meant that in these embodiments, wax is present in an amount no greater than about 5, no greater than about 2.5, no greater than about 1, or approaching or equaling 0, pbw, each based on 100 pbw of the layer 16. Typically, the layer 16 has little to no wax to allow for a uniform layer 16, which can prevent water from permeating the layer 16. However, wax can be utilized in the layer 16 if compatible with the specific components utilized, e.g. the isocyanate component. Customary waxes and amounts thereof can be utilized. In certain embodiments, the encapsulated fertilizer 10 is formed in the absence of wax.

In certain embodiments, the layer 16 is substantially free of sulfur. By "substantially free", it is meant that in these embodiments, sulfur is present in an amount no greater than about 5, no greater than about 2.5, no greater than about 1, or approaching or equaling 0, pbw, each based on 100 pbw of the layer 16. The method will now be described in further detail.

Figure 3:
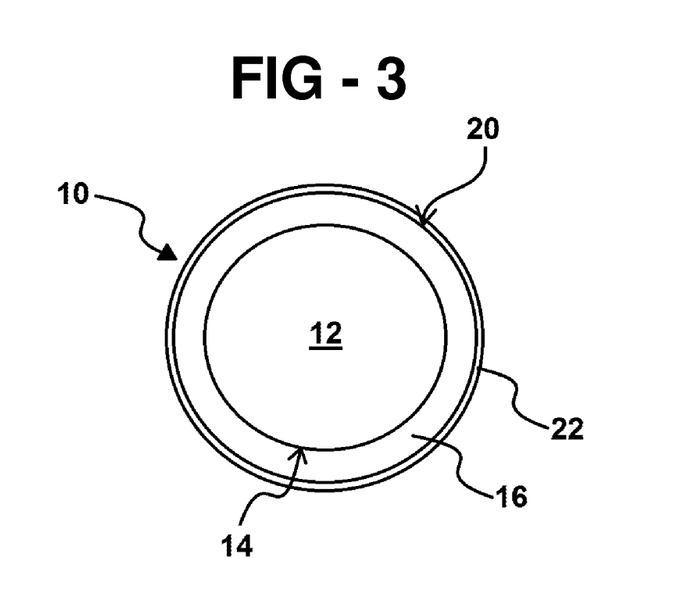
FIG. 3 is a cross-section of another encapsulated fertilizer further having a sealant layer.

Referring to FIGS. 3 and 4, the encapsulated fertilizer 10 may include a sealant layer 22 disposed about the layer 16. The sealant layer 22 may seal imperfections in the layer 16, may improve the flow characteristics of the encapsulated fertilizer 10, and may provide improved moisture barrier properties. The sealant layer 22 may comprise organic waxes, such as paraffinic wax, vegetable wax, triglycerides, microcrystalline thermoplastic polymers, mineral oils, petroleum waxes or combinations thereof. More particularly, the sealant layer 22 may comprise paraffinic oil, paraffinic wax, vegetable wax, triglyceride, microcrystalline wax, petrolatum, olefin, polyethylene, and combinations thereof. Further suitable sealants for forming the sealant layer 22 are described in U.S. Pat. App. Pub. No. 2013/0305796 to Hudson et al.

The sealant layer 22 may comprise other materials other than those described above. The sealant layer 22 may include various conventional additives. For example, the sealant layer 22 may include various polymers to improve the abrasion resistance and barrier properties, anti-blocking adjuvants to improve the handling characteristics, dyes, and other known adjuvants.

Generally, the sealant layer 22 has a melting point below the melting point of the core particle 12 and the layer 16. For example, the sealant layer 22 may have a melting point below about 80° C. and flow at the temperature of its application process. The sealant layer 22 may be non-tacky after application to the layer 16 at temperatures below about 60, 50, or 40° C. Furthermore, the sealant layer 22 may have a melt viscosity less than about 1,500 cP or less than about 1,000 cP at its application temperature to allow for good flowability on the core particle 12 having the layer 16.

While optional, the sealant can be utilized in various amounts. For example, the encapsulated fertilizer 10 may include the sealant layer 22 in various amounts depending on the desired release rate of the encapsulated fertilizer 10. Typically, the sealant layer 22 is present in an amount of from about 0.1 to about 10, about 0.1 to about 5, about 0.5 to about 3, pbw, or any amount between about 0.1 and about 10 pbw, each based on 100 pbw of the encapsulated fertilizer 10. The sealant layer 22 can be of various average thicknesses, such as those above for the layer 16.

As introduced above, the core particle 12 is provided. The core particle 12 can be provided in various manners, such as in a free flowing particulate form. Typically, the core particle 12 is disposed in a vessel to retain the core particle 12 and assist in formation of the encapsulated fertilizer 10. The vessel can be of various sizes and shapes, and should be closable or sealable to retain components therein during manufacture of the encapsulated fertilizer 10. The core particle 12 can be provided with or without the intermediate layer 18.

In various embodiments, the method further comprises the step of heating the core particle 12. The core particle 12 can be heated via direct and/or indirect heat. For example, the vessel can be heated (e.g. via a heat exchanger), the air in the vessel can be heated, the core particle 12 can be heated, etc., and combinations thereof. While ambient air in the vessel may be relied upon to provide ambient moisture for reaction with the isocyanate component, heating the core particle 12 is useful to establish at least a portion of the ambient moisture, alternatively a majority (to all) of the ambient moisture, for reaction with the isocyanate component. This is especially the case when the fertilizer of the core particle 12 is hygroscopic (e.g. the fertilizer comprises urea). Heating the core particle 12 can also be useful for indirectly heating the isocyanate component, facilitate reaction, etc.

In certain embodiments, the core particle 12 is heated to a temperature of at least about 20° C., alternatively to a temperature of from about 15 to about 45, about 40 to about 90, about 60 to about 120, ° C., or any temperature between about 0 and 200° C. The core particle 12 can be heated for various periods of time. To retain/establish ambient moisture, and especially ambient moisture provided by the core particle 12, the vessel should be closed. Closing the vessel is also useful for maintaining temperature. In specific embodiments, the vessel is heated to heat the core particle 12 disposed therein. In further embodiments, the vessel is a tumbler, which allows for uniform mixing, heating, etc.

In certain embodiments, the method further comprises the step of heating the isocyanate component. This can be in addition or alternate to heating of the core particle 12. The isocyanate component can be heated via direct and/or indirect heat. For example, the isocyanate component can be preheated (e.g. in a drum and/or inline) before disposing the isocyanate component into the vessel. In certain embodiments, the isocyanate component is heated to a temperature of at least about 0° C., alternatively to a temperature of from about 20 to about 40, about 25 to about 60, about 15 to about 80° C., or any temperature between about 0 and 150° C.

The isocyanate component is applied to the core particle 12. Upon contact (and while under reaction conditions understood in the art), the isocyanate component and ambient moisture begin to react to form the layer 16 disposed about the core particle 12. Specifically, it is thought that after application of the isocyanate component to the outer surface 14 of the core particle 12, ambient moisture (i.e., water in the gaseous form) begins to react with free isocyanate groups provided by the isocyanate component to form polyurea linkages and therefore, the layer 16. If the applied isocyanate component is at a temperature lower than that of the ambient air/moisture in the vessel, it is also thought that a portion of the ambient moisture condenses to liquid form on the applied isocyanate component, which further facilitates formation of the layer 16. Reaction can also be occurring between the surface moisture and/or the surface amines (if present) and the isocyanate component.

The isocyanate component can be applied by various methods understood in the art. Examples of suitable methods of encapsulation include bulk coating, tumbling, sheet coating, pan coating, fluidized-bed coating, co-extrusion, spraying and spinning disk encapsulation, etc. These methods and other encapsulation methods are understood by those of ordinary skill in the art.

In certain embodiments, the isocyanate component is sprayed, atomized, and/or fogged onto the core particle 12, typically a number of core particles 12, while the core particles 12 are being agitated in suitable equipment. Spraying, atomizing, and/or fogging the isocyanate component onto the core particle 12 generally results in a uniform, complete, and defect-free layer 16 disposed about the core particle 12. Spraying, atomizing, and/or fogging the isocyanate component also results in a thinner and less expensive layer 16 disposed about the core particle 12. Several application steps can be used to build-up the thickness of the layer 16. Spraying, atomizing and fogging of the isocyanate component can occur via use of one or more nozzles in the vessel. In specific embodiments, the isocyanate component is sprayed onto the core particle 12.

In various embodiments to maximize coverage of the core particles 12, the isocyanate component is generally applied by spraying droplets or atomizing or fogging particles of the isocyanate component onto the core particles 12 as the core particles 12 are being tumbled in a rotary blender or similar apparatus (i.e., as the vessel). As another example, the core particles 12 can be coated with the isocyanate component in a rotary drum blender equipped with at least one spinning disk atomizer. Tumblers, drums, or rollers including baffles can also be used as the vessel. Alternatively, the core particles 12 can be provided directly to a carrier, e.g. a screened conveyor belt and the isocyanate component can be applied to the core particles 12, e.g. by spraying or sheeting, to form the encapsulated fertilizers 10. Prior to the layer 16 fully curing, the encapsulated fertilizer 10 is typically kept moving to avoid agglomeration. Optionally, the sealant can later be applied in a similar manner as the isocyanate component above to form the sealant layer 22.

The amount of the isocyanate component to be applied and mixed with the core particles 12 is dependant upon several variables including the specific isocyanate component, the size and type of core particle 12, the intended end use of the encapsulated fertilizer 10, the desired thickness of the layer 16, the desired properties of the encapsulated fertilizer 10, etc.

Typically, the method of this disclosure is free of the step of applying an isocyanate-reactive component to the core particle 12 to form the encapsulated fertilizer 10. In other words, no isocyanate-reactive component is present on the outer surface 14 of the core particle 12. The isocyanate-reactive component is typically selected from the group of polyols, polyamines, water, and combinations thereof. As described above, the isocyanate component is applied directly to the outer surface 14 of the core particle 12. Therefore, no intervening layer formed from a purposefully applied isocyanate-reactive component is present. Some amount of surface moisture can be present, but this is outside the scope of purposefully applying water to the core particle 12.

The encapsulated fertilizer 10 can be of various sizes and shapes. Typically, the encapsulated fertilizer 10 is substantially spherical, having an average diameter of from about 0.5 to about 7.5, about 0.5 to about 3, about 1 to about 2, mm, or any average diameter between about 0.5 and about 7.5 mm. However, the encapsulated fertilizer 10 can be of other shapes, such as irregular, pocked, oblong or platelet shaped.

The encapsulated fertilizer 10 can be supplied to consumers in various manners. Typically, the encapsulated fertilizer 10 is supplied in bags, such as paper and/or plastic bags containing about 1 to about 80 pounds of the encapsulated fertilizer 10 for ease of handling and use. Such bags can include other nutrients and/or fillers in addition to the encapsulated fertilizer 10, such as those typically included along with conventional fertilizers. In certain embodiments, the bags can include both encapsulated and non-encapsulated fertilizers. The bags can include different grades of encapsulated fertilizer 10, such as ones having different dissolution rates, which can be imparted by different layer 16 thicknesses.

Various types of the encapsulated fertilizer 10 can be supplied to consumers in blends, such as encapsulated fertilizer 10 having different core particles 12, e.g. different types of fertilizers, such as nitrogen and potash, nitrogen and sulfur, etc. The encapsulated fertilizer 10 can also be of different physical properties, such as different sizes and shapes, different dissolution rates, different hardness, etc. Such properties are described below. Generally, the encapsulated fertilizer 10 does not agglomerate, such that the encapsulated fertilizer 10 is pourable for ease of use, i.e., is free flowing, and thereby does not clog apparatuses used to supply and/or spread the encapsulated fertilizer 10.

The encapsulated fertilizer 10 can be of various hardness (or "crush" strength) depending on several variables including the specific components and amounts thereof utilized, size and shape of the core particle 12, size and shape of the encapsulated fertilizer 10, and thickness of the layer 16. Typically, the encapsulated fertilizer 10 has an excellent hardness relative to prior art encapsulated fertilizers. Hardness of the encapsulated fertilizer 10 provides for longer life of the encapsulated fertilizer 10, such that the encapsulated fertilizer 10 has excellent handling and storage/shelf life. Specifically, the layer 16 provides for increased resiliency of the encapsulated fertilizer 10, relative to conventional encapsulated fertilizers. Typically, the encapsulated fertilizer 10 has a shelf life of at least about 1, at least about 5, or at least about 10, months. The encapsulated fertilizer 10 can have a near infinite shelf life, more typically 20 or more years, based in part upon exposure (or lack thereof) to moisture.

The encapsulated fertilizer 10 is also useful for providing the core particle 12, e.g. fertilizer, in a time-released manner. Time release, i.e., time required for the layer 16 to be perforated such that the core particle 12 can be released to the surrounding environment, depends on several variables including the specific components and amounts thereof utilized, size and shape of the core particle 12, size and shape of the encapsulated fertilizer 10, and thickness of the layer 16. Such a determination can be easily tested by placing the encapsulated fertilizer 10 in a beaker full of water, such that the encapsulated fertilizer 10 is completely covered by the water. Perforations of the layer 16 can be evaluated upon visual inspection of the encapsulated fertilizer 10, and/or by observing changes in clarity of the water. Perforations can range from pin-holing in or sloughing off of the layer 16. Time release only applies if the layer 16 fully envelops the core particle 12; otherwise, the core particle 12 is already at least partially exposed to the surrounding environment.

Time release of the encapsulated fertilizer 10 is also associated with dissolution rate of the encapsulated fertilizer 10, as introduced above. Dissolution rate is generally a measurement of how much of the core particle 12 is dispersed into the surrounding environment. For example, the amount of fertilizer released to the surrounding soil over time once the encapsulated fertilizer 10 is exposed to moisture, e.g. from rain or irrigation. The encapsulated fertilizer 10 has excellent dissolution rates relative to prior art encapsulated fertilizers. Generally, the encapsulated fertilizer 10 of this disclosure has a uniform dissolution rate, i.e., a near steady-state release of the core particle 12 over a period of time. Alternatively, or in addition to, the encapsulated fertilizer 10 of this disclosure has a time-delayed release, e.g. the core particle 12 will begin to dissolve and therefore release some period of time after the encapsulated fertilizer 10 is first exposed to a sufficient amount of moisture to permeate the layer 16.

One way in which such dissolution works is by the layer 16 becoming permeated such that that water can enter into the encapsulated fertilizer 10. After entry of water, the water can interact with the core particle 12. For example, if the core particle 12 comprises a nitrogen based fertilizer, after water migrates through the layer 16, the nitrogen based fertilizer dissolves into solution inside the encapsulated fertilizer 10, and the solution then migrates out through the layer 16 into surrounding soil to deliver the nitrogen. When the core particle 12 is the fertilizer, water and/or other liquids generally cannot permeate the layer 16 too quickly, thus preventing the water and/or other liquids from rapidly dissolving the core particle 12, thus preventing phytotoxicity, and providing for more predictable and controlled dissolution rates.

The following examples, illustrating the method and encapsulated fertilizer of this disclosure, are intended to illustrate and not to limit the present invention.

EXAMPLES

Encapsulated fertilizer is prepared in a lab-scale tumbler (or mixer). Core particles, specifically urea fertilizer spheres, are added to the tumbler. The tumbler is closed. The tumbler is heated to establish ambient moisture therein. Specifically, the core particles are heated to about 60° C. for 90 minutes. The core particles have a moisture content of from about 5 to about 10 wt. % prior to heating. Moisture content can be determined via a moisture balance.

An isocyanate component is heated to about 35° C. The isocyanate component is a liquid modified MDI, specifically an isocyanate-terminated prepolymer comprising the reaction product of excess 4,4'-MDI and at least one polyol. The isocyanate component has an NCO content of 23 wt. %, a viscosity of 700 cps at 25° C., and is commercially available from BASF Corporation.

The tumbler is opened and the isocyanate component is sprayed into the tumbler and onto the core particles. The tumbler is closed and rotated to ensure complete contact between the core particles and the isocyanate component. Complete contact results in a layer disposed about the core particles. The layer is a polyurea/polyurethane layer. Rotation continues to minimize agglomeration resulting in a free flowing group of encapsulated fertilizers, i.e., encapsulated urea spheres. Overall, the layer is applied at 3 wt % based on total core particle weight.

Figure 5:
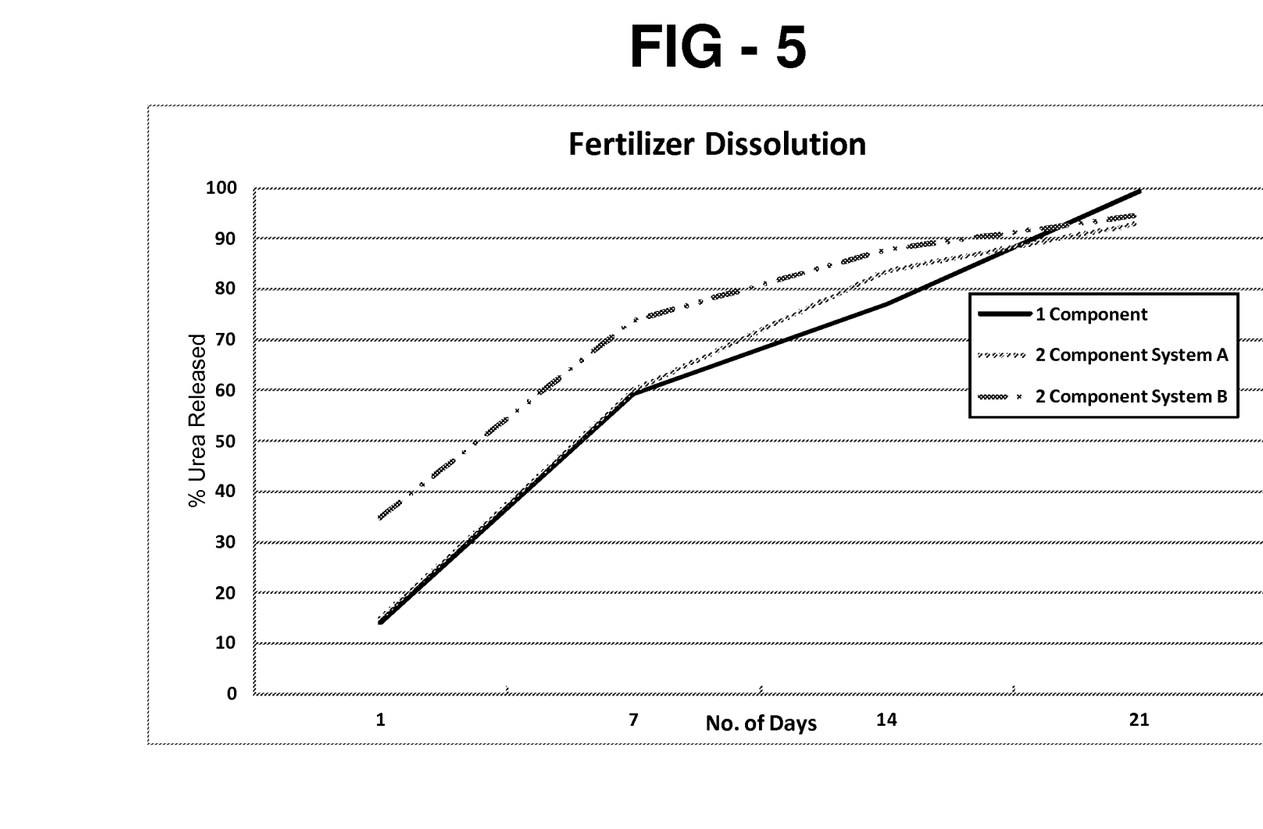
FIG. 5 is a chart illustrating dissolution rates of example encapsulated fertilizers.

Referring to FIG. 5, dissolution rates of various encapsulated fertilizers can be appreciated. "1 Component" encapsulated fertilizer (i.e., invention example) is the example described above having a 3 wt. % layer. "2 Component System A" and "2 Component System B" encapsulated fertilizers (i.e., comparative examples) are each formed by separately applying isocyanate and isocyanate-reactive components to the core particles. Each of "A" and "B" has a 3 wt % layer including 2.5 wt. % urethane/urea and 0.5% wax. The comparative examples are generally formed according to the disclosure of U.S. Pat. No. 7,416,785 to Mente. As illustrated in the chart, it is thought that dissolution rate of the invention example is generally more uniform over time relative to the comparative examples.

It is to be understood that the appended claims are not limited to express any particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A method of forming an encapsulated fertilizer, said method comprising the steps of:
   providing a core particle comprising a fertilizer and having an outer surface;
   coating the outer surface with a dust suppressant forming an intermediate layer;
   applying an isocyanate component having isocyanate functional groups directly to the intermediate layer; and
   reacting the isocyanate component with ambient moisture including any ambient moisture that condenses into liquid form on the applied isocyanate component to form a layer disposed about the core particle to form the encapsulated fertilizer;
   wherein the layer comprises polyurea linkages, and optionally, polyurethane linkages, and
   the method is free of a step of purposefully applying an isocyanate-reactive component to the core particle, the isocyanate-reactive component being a polyol, polyamine, water, and/or combinations thereof.

2. The method as set forth in claim 1, wherein no isocyanate-reactive component is present on the outer surface of the core particle.

3. The method as set forth in claim 1, wherein the core particle is at least partially coated with a compound other than fertilizer and inert with respect to the isocyanate component prior to the step of applying.

4. The method as set forth in claim 1, wherein the isocyanate component comprises an isocyanate-terminated prepolymer, with the isocyanate-terminated prepolymer comprising polyurethane linkages such that the layer is further defined as a polyurea/polyurethane layer.

5. The method as set forth in claim 4, wherein the isocyanate-terminated prepolymer:
   i) comprises the reaction product of a diphenylmethane diisocyanate (MDI) and a polyol having at least two hydroxyl functional groups; and/or
   ii) is present in an amount of from about 10 to about 90 by weight, based on 100 parts by weight of the isocyanate component.

6. The method as set forth claim 1, wherein the isocyanate component:
   i) is selected from the group of polymeric diphenylmethane diisocyanates (PMDIs), diphenylmethane diisocyanates (MDIs), and combinations thereof; and/or
   ii) has an NCO content of from about 1 to about 50 wt. %.

7. The method as set forth in claim 1, wherein the core particle has a moisture content of at least about 1 wt. % prior to the step of applying.

8. The method as set forth in claim 7, further comprising the step of heating the core particle to establish at least a portion of the ambient moisture for reaction with the isocyanate component.

9. The method as set forth in claim 8, wherein the core particle is heated to a temperature of at least about 0° C.

10. The method as set forth in claim 1, wherein the step of applying is further defined as spraying.

11. The method as set forth in claim 1, further comprising the step of heating the isocyanate component.

12. The method as set forth in claim 1, wherein the outer surface of the core particle comprises surface moisture, and wherein the step of reacting is further defined as reacting the isocyanate component with ambient moisture and the surface moisture to form the encapsulated fertilizer.

13. The method as set forth in claim 1, wherein the outer surface of the core particle comprises amine functional groups, and wherein the step of reacting is further defined as reacting the isocyanate component with ambient moisture and the amine functional groups to form the encapsulated fertilizer.

14. The method as set forth in claim 1, wherein the outer surface of the core particle comprises surface moisture and amine functional groups, and wherein the step of reacting is further defined as reacting the isocyanate component with ambient moisture, the surface moisture, and the amine functional groups to form the encapsulated fertilizer.

15. The method as set forth in claim 1, wherein the fertilizer comprises urea.

16. The method as set forth in claim 1, wherein the layer:
i) is substantially free of sulfur; and/or
ii) is formed in the presence of a catalyst; and/or
iii) has an average thickness of at least about 5 microns.

* * * * *